April 26, 1949.  J. B. OLSON  2,468,571
MANGER GUARD
Filed Feb. 9, 1944

INVENTOR.
JOHN B. OLSON
BY
ATTORNEY

Patented Apr. 26, 1949

2,468,571

UNITED STATES PATENT OFFICE 2,468,571

MANGER GUARD

John B. Olson, Fort Atkinson, Wis., assignor to James Manufacturing Company, Fort Atkinson, Wis.

Application February 9, 1944, Serial No. 521,724

1 Claim. (Cl. 119—61)

The present invention relates to a manger guard adapted for use in modern dairy buildings, wherein conventional stanchions are generally used and the manger or feed trough is generally made of concrete.

An object of the present invention is to provide means for keeping the hay, fodder or feed in the manger or feed trough where it can be reached by the animal and wherein any hay, fodder or feed which might be left on or thrown in front of the manger guard will be out of sight and out of mind, thus to prevent the animal from trying to reach such feed by pressing forward against the stanchion bars, which results in the disease known as wing shoulder and other difficulties well known to the dairyman as will hereinafter appear.

Another object of the present invention is to position the guard at a great enough angle, whereby any material moved on top of the guard will be moved back into the manger by gravity.

A further object of the present invention is to provide a narrow space under the lower rear edge of the guard so as to permit a flow of air from the area in front of the guard into the manger, the air flow being beneficial to the feed and also to the animal.

In modern ventilated dairy barns air is admitted into the enclosure at the ceiling and drops to the floor because it is colder than the air near the floor. Thus with applicant's manger guard some fresh air is directed from in front of the guard into the manger and to the head of the animal, thus displacing warm air which has already become contaminated.

In the present invention I provide a rail near the bottom of the guard and position this rail a short distance above the guard, thus to further restrain the animal from nosing the hay or feed out of the manger.

Furthermore I provide a manger guard which is preferably hinged at its upper front edge so that any feed or roughage that may be in front of the guard can be readily swept back into the trough by raising the rear of the guard on its hinges.

Important objects of the present invention are to provide a simple device, which can be manufactured at low cost and can be easily installed.

To these and other useful ends my invention consists of parts or combinations of parts, and their equivalents as hereinafter described and claimed and shown in the accompanying drawings in which:

Figure 1:
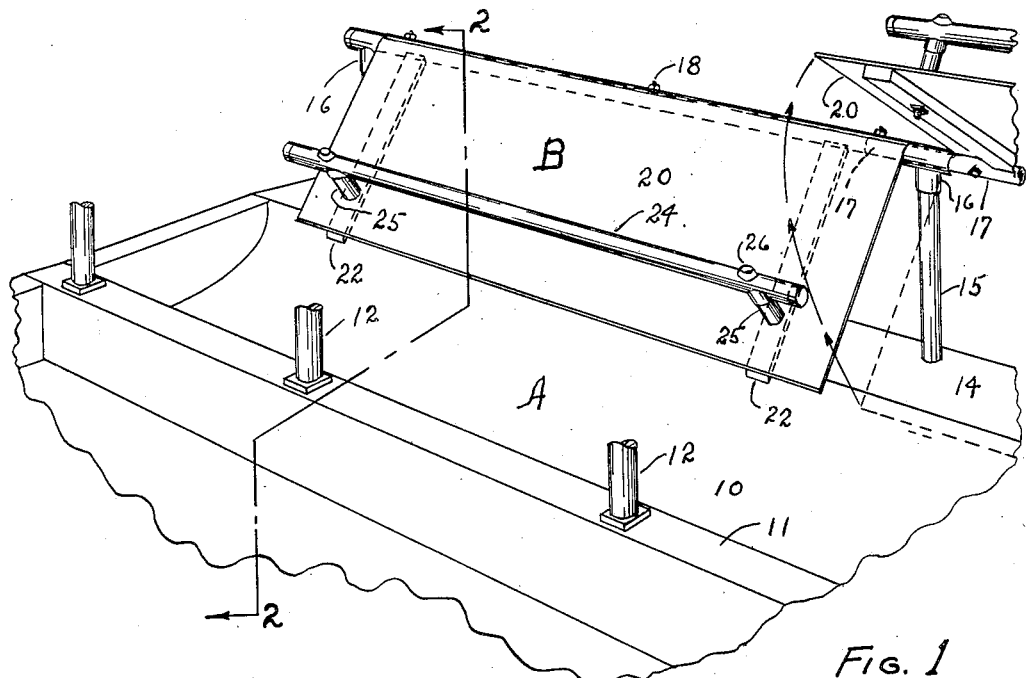
Figure 1 is a perspective view of my invention as applied to a modern manger.
Figure 3:
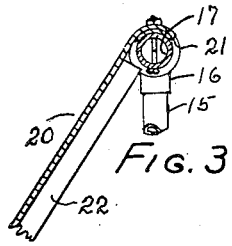
Figure 3 is an enlarged section of a fraction of my manger guard taken on line 2 of Figure 1.

As thus illustrated the manger is designated in its entirety by reference character A. The manger guard is designated in its entirety by reference character B. Manger A comprises a trough 10, the rear wall 11 of the trough being adapted to support stanchion supporting posts 12. The barn floor level is designated by reference numeral 13. Thus there is provided a raised portion 14 so as to give the trough 10 the proper frontal height.

I provide spaced posts 15, each having preferably at their tops T-fittings 16, the horizontal part of this fitting being adapted to rotatably receive a pipe 17.

Figure 2:
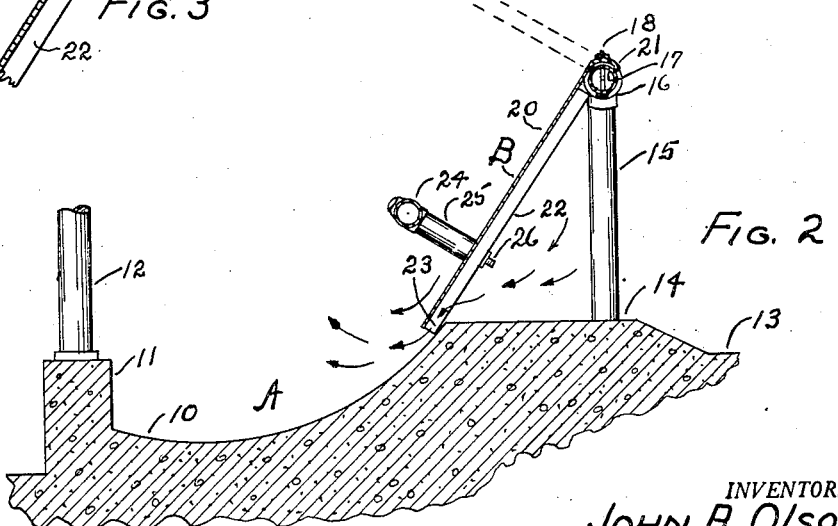
Figure 2 is a sectional view of the device shown in Figure 1 and taken on lines 2—2 of Figure 1.

My improved manger guard comprises preferably a sheet metal plate 20. The upper edge of this plate is folded double as at 21, so as to strengthen the edge of member 20 which edge is secured to member 17 by means of spaced bolts 18, whereby member 20 may be readily lifted; for example, to the position shown by dotted lines in Figure 2. I provide preferably two wood strips 22 and secure them to plate 20 in the position shown in Figure 1 by dotted lines. When the guard is in its normal position the rear ends of members 22 will rest on the front upper edge of the trough as illustrated in Figure 2. Thus there will be left a narrow opening under member 20 as at 23 for the passage of air as illustrated by curvilinear arrows. Clearly a small volume of air as it moves downward in the room will flow into trough 10 as indicated, thus to benefit the feed in the trough by contact with fresh air and also give the animal the benefit of this fresh air.

I provide preferably a bar or tube 24 and support it a distance from member 20 by means of tubes or posts 25 and bolts 26 which pass through member 24 and through members 20 and 22. Thus member 24 will be rigidly held into the position shown in the drawings.

Bar 24 is not absolutely necessary for the successful operation of applicant's device. It is however desirable because it restrains the animal from nosing the hay over the top edge of member 20. Indeed this bar positioned as it is, largely prevents the animal from throwing the hay on the top surface of member 20. However, any feed or hay that may be thrown on the top surface of member 20 will slide back into the trough by gravity.

It will be seen that I have provided a very simple device which is of great value to the barn equipment for reasons already outlined, particularly so since it prevents the animal from pressing forward against the stanchion bars because the feed, hay, fodder, etc. will remain in the trough and within easy reach of the animal. Furthermore my improved manger front is very important because when it is not used much of the feed and roughage is moved out of the trough and in an endeavor to reach the feed the cow will push so hard against the stanchion that the front feet will slip back on the floor causing her to drop to her knees thus causing what is known as "big knee."

Having thus shown and described my invention I claim:

A device of the character described comprising, a manger, a feed trough transversely arranged adjacent the front of the manger, a plate positioned at an angle in front of the feed trough and extending upwardly and forwardly from the front of the trough, the lower edge of said plate terminating past the upper edge of the trough, the angle of the plate being great enough to cause any material on top of the plate to return to the trough by gravity, spaced means between the lower edge of the plate and the trough adapted to provide an air passageway, spaced posts secured to the plate a short distance from the bottom edge of the plate, a bar secured to the top of the posts and being substantially the length of the plate, said bar being supported a sufficient distance from the plate to prevent the animal from nosing roughage on top of the plate in rear of the bar.

JOHN B. OLSON.

REFERENCES CITED

The following references are of record in the file of this patent:

UNITED STATES PATENTS

| Number | Name | Date |
|---|---|---|
| 931,742 | English | Aug. 24, 1909 |
| 1,184,982 | Neller | May 30, 1916 |
| 1,209,688 | Drew | Dec. 26, 1916 |
| 1,874,598 | Olson | Aug. 30, 1932 |
| 2,085,308 | Gandrud | June 29, 1937 |
| 2,371,617 | Halverson | Mar. 20, 1945 |

FOREIGN PATENTS

| Number | Country | Date |
|---|---|---|
| 11,003 | Sweden | May 19, 1900 |
| 321,051 | Great Britain | Oct. 31, 1929 |